United States Patent
Coudray et al.

(10) Patent No.: US 6,325,477 B1
(45) Date of Patent: *Dec. 4, 2001

(54) METHOD AND DEVICE FOR DETERMINING THE QUANTITY OF PRODUCT PRESENT IN A RESERVOIR, A PRODUCT RESERVOIR AND A DEVICE FOR PROCESSING ELECTRICAL SIGNALS INTENDED FOR SUCH A DETERMINATION DEVICE

(75) Inventors: Pascal Coudray, La Chapelle des Fougeretz; Marie-Hélène Froger, Chateaugiron, both of (FR)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/004,513

(22) Filed: Jan. 8, 1998

(30) Foreign Application Priority Data

Jan. 31, 1997 (FR) .................................................. 97 01094

(51) Int. Cl.[7] .............................. B41J 2/195; B41J 29/393
(52) U.S. Cl. .................................................. 347/7; 347/19
(58) Field of Search .................................. 347/7, 19, 14; 399/24; 73/304 C

(56) References Cited

U.S. PATENT DOCUMENTS

| | | | |
|---|---|---|---|
| 4,201,085 | * 5/1980 | Larson | 73/304 C |
| 4,415,886 | 11/1983 | Kyogoku et al. | 340/618 |
| 4,636,814 | * 1/1987 | Terasawa | 347/7 |
| 4,676,101 | * 6/1987 | Baughman | 73/304 C |
| 4,977,786 | 12/1990 | Davis | 73/864.24 |
| 5,465,619 | * 11/1995 | Sotack et al. | 73/304 C |
| 5,553,479 | * 9/1996 | Rauchwerger | 73/304 C |
| 5,611,240 | * 3/1997 | Yamaguchi | 73/304 C |
| 5,682,184 | * 10/1997 | Stephany et al. | 347/7 |

FOREIGN PATENT DOCUMENTS

| | | |
|---|---|---|
| 3344447 | 6/1984 | (DE) . |
| 0208377 | 1/1987 | (EP) . |
| 61265531 | 11/1986 | (JP) . |
| 1-304950 | 12/1989 | (JP) . |

* cited by examiner

Primary Examiner—John Barlow
Assistant Examiner—Juanita Stephens
(74) Attorney, Agent, or Firm—Fitzpatrick, Cella, Harper & Scinto

(57) ABSTRACT

A device and a method for determining the quantity of product present in a reservoir, and more particularly determining with precision when there is a predetermined quantity of product in the reservoir. The invention applies to an ink reservoir in an image formation device, such as a printer. According to the invention, the product is connected to a predetermined potential and an electrical field is established through the product present in the reservoir. The electrical field passing through the product is measured in order to produce an electrical signal representing the electrical field, and the resulting electrical signal is processed in order to produce a signal representing the quantity of product present in the reservoir and to detect the interruption of the connection of the product to the predetermined potential, where the interruption corresponds t the predetermined quantity of product in the reservoir.

70 Claims, 10 Drawing Sheets

Figure 1:
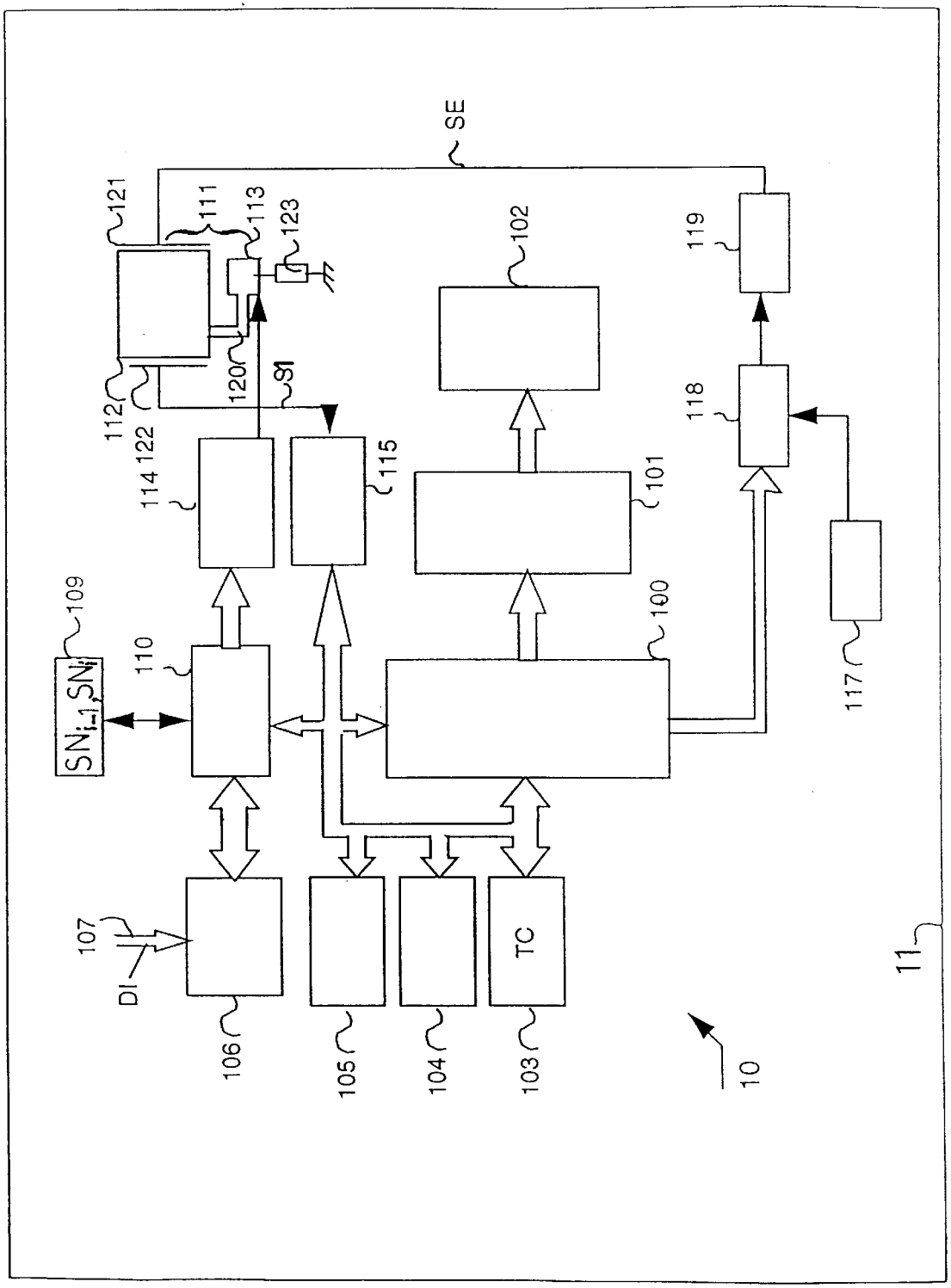

METHOD AND DEVICE FOR DETERMINING THE QUANTITY OF PRODUCT PRESENT IN A RESERVOIR, A PRODUCT RESERVOIR AND A DEVICE FOR PROCESSING ELECTRICAL SIGNALS INTENDED FOR SUCH A DETERMINATION DEVICE

The present invention concerns in general terms a method and device for determining the quantity of product present in a reservoir, and more particularly for determining the quantity of ink present in the reservoir of an image formation device. The present invention also concerns a product reservoir, notably an ink reservoir for an image formation device. It also concerns a device for processing electrical signals intended to be used in a device for determining the quantity of product present in a reservoir.

For image formation devices, such as printers, which use ink jet technology, numerous devices and methods have been designed for determining the quantity of ink present in the reservoir.

The document U.S. Pat. No. 4,700,754 describes a device for detecting the quantity of liquid ink in a flexible reservoir contracting as the ink level decreases. The external bottom wall is coated with a conductive layer constituting one pole of a capacitor. The wall of the reservoir serves as a dielectric of the capacitor thus produced whilst the ink surface in contact with the bottom wall constitutes the second pole of the capacitor. A measuring electrode placed at the centre of the reservoir connects the ink to a measuring device. When the ink level decreases, the surface area of ink facing the conductive layer coated on the wall decreases, and therefore the value of the equivalent capacitance also decreases. The fact that the reservoir is flexible enables the measuring electrode to remain in contact with the ink.

This type of detection is used for a cartridge having flexible walls and cannot be applied to rigid cartridges. This is because contact between the measuring circuit and the ink can be made only if the top wall, when it is crushed, forces the measuring electrode to be in contact with the ink.

In addition, it is necessary to provide an electrode in contact with the ink in the reservoir, which complicates the manufacture of the reservoir and increases the cost thereof.

Moreover, it is difficult to know the ink level if the latter is below a level lying between the measuring electrode and the bottom wall. This is because the measuring electrode cannot go down as far as the base of the reservoir. The measurement range is thus limited in the lower values. However, it is precisely when there is very little ink remaining in the reservoir that it is advantageous to be alerted so as to change the reservoir or fill it.

The document EP-A-0 028 399 describes a device for detecting a minimum quantity of ink in a reservoir. A resonant circuit includes a resistor and a capacitor whose poles are formed by two metal plates between which the ink reservoir is situated. The reservoir containing the ink forms the dielectric of the capacitor. As the quantity of ink decreases, the value of the capacitance of the capacitor thus formed varies.

The resonant circuit is calibrated so that its resonant frequency corresponds to a predetermined quantity of ink in the reservoir. The maximum voltage at the terminals of the resistor is thus achieved for this predetermined quantity of ink which constitutes a threshold.

By measuring the voltage at the terminals of the resistor of the resonant circuit, the passing of the threshold is detected, and a warning signal is activated.

According to this document, only the passing of a threshold is measurable, and consequently only a quantity of ink can be detected. Under these circumstances, this device is of interest if the quantity of ink detected is small, in order to alert the user just before there is no more ink in the reservoir.

However, it is very difficult with this device to determine accurately what voltage corresponds exactly to a small quantity of ink. It is then necessary to provide a safety margin in order to alert the user before the reservoir is empty. This safety margin, for example around 20 percent of the total quantity of ink, results in a waste of ink, since the user will change the reservoir whilst there is still ink inside.

The present invention aims to remedy the drawbacks of the prior art by providing a device and method for determining the quantity of product present in a reservoir, which determines, with satisfactory reliability and with precision, a predetermined quantity of product, whilst being simple and economical to implement.

For this purpose, the invention proposes a method for determining the quantity of product present in a reservoir, characterised in that it includes the steps of:

connecting the said product to a predetermined potential, establishing an electrical field through the product present in the reservoir, measuring the electrical field passing through the product, in order to produce an electrical signal representing the electrical field, and processing the electrical signal in order to produce a signal representing the quantity of product present in the reservoir, and to detect the interruption of the connection of the product to the predetermined potential, the said interruption corresponding to a predetermined quantity of product present in the reservoir.

In general terms the invention applies to any product, notably a consumable product used in a given device.

Preferably, the invention applies to ink contained in the reservoir of an image formation device. "Ink" here designates any liquid, solid, gaseous or powder product intended to modify an optical or physical factor of the printing medium.

The method according to the invention not only has the advantage of resolving the technical problems set out above, but also of being adaptable to a large number of existing devices.

By virtue of the invention, the predetermined quantity of product which is determined with precision is for example a zero, or quasi-zero, quantity, or any other quantity, according to the requirements relating to each application of the invention.

According to one of the aspects of the invention, the connection of the product to the predetermined potential is a connection of the capacitive type, advantageously avoiding direct contact of the product with a part at a potential.

According to a preferred characteristic, the step of processing the electrical signal includes the detection and storage in memory of the amplitude of the electrical signal and the comparison of the said amplitude with at least one amplitude previously detected and stored to memory.

This comparison makes it possible to monitor the change in amplitude and to detect an abrupt change in the values measured, which indicates the interruption of the connection of the product to the predetermined potential.

According to one characteristic of the invention, the method also includes the step of indicating the detection of the said predetermined quantity of product present in the reservoir, or the step of transmitting a signal representing the detection of the said predetermined quantity of product present in the reservoir to a remote device so that it displays a message representing the detection of the said predetermined quantity.

The user is thus alerted to the fact that the predetermined quantity is reached. For example, if this quantity is zero, or quasi-zero, he can fill the reservoir or replace it with a full reservoir.

According to a preferred characteristic, the processing step includes the detection of the amplitude of the electrical signal, and the production of the signal representing the quantity of product from a value given by a calibration table according to the amplitude detected.

The method also includes the step of displaying a representation of the quantity of product present in the reservoir, or the step of transmitting the signal representing the quantity of product present in the reservoir to a remote device so that it displays a representation of the quantity of product present in the reservoir.

This product being a consumable product used in a given device, the user knows at any moment the quantity of product remaining in the reservoir and is thus capable, for example, of deciding to fill the reservoir before it is completely empty, or to replace the empty reservoir with a full reservoir, or to replace the cartridge comprising the reservoir, in the case of an ink cartridge.

In another aspect, the invention concerns a device for determining the quantity of product present in a reservoir, characterised in that it includes:

means of connecting the said product to a predetermined potential,
means of establishing an electrical field through the product present in the reservoir,
means of measuring the electrical field passing through the product in order to produce an electrical signal representing the electrical field, and
means of processing the electrical signal in order to produce a signal representing the quantity of product present in the reservoir, and in order to detect the interruption of the connection of the product to the predetermined potential, the said interruption corresponding to a predetermined quantity of product present in the reservoir.

The device according to the invention is particularly suitable for implementing the above method. The device according to the invention has advantages analogous to those of the method set out above.

According to a preferred characteristic of the invention, the establishment means include first and second metallic elements disposed outside the reservoir. The first and second metallic elements then form the poles of a capacitor, whose dielectric is formed by the reservoir containing the product.

According to preferred characteristics, the establishment means are fed by an oscillator connected to the establishment means via a switch and the electrical field is produced by a high-frequency alternating signal, for example with a frequency substantially equal to 1 MHz.

This frequency is suited both to the measurement of the quantity of product in the reservoir and to the detection of the interruption of the connection of the product to the predetermined potential.

According to another characteristic of the invention, simple and economical to implement, the measuring means include an envelope detector and an analogue to digital converter for producing a digital signal representing the amplitude of the electrical signal.

According to yet another characteristic of the invention, a reserve is provided downstream of the place of connection of the product to a predetermined potential, so that the predetermined quantity of product is not zero, but is equal to the quantity of product present in the reserve.

According to preferred characteristics, the device also includes a means of displaying a representation of the said predetermined quantity of product present in the reservoir.

It also includes a means of transmitting a signal representing the predetermined quantity of product present in the reservoir to a remote device so that it displays a message representing the said predetermined quantity of product present in the reservoir.

It also includes a means of displaying a representation of the quantity of product present in the reservoir.

The user is thus effectively informed about the quantity of product present in the reservoir.

In another aspect, the invention concerns a reservoir for containing a product, characterised in that it has connection means designed to connect the product to a predetermined potential, with a view to detecting the interruption of the connection of the product to the predetermined potential, the said interruption corresponding to at least a predetermined quantity of product present in the reservoir.

According to a preferred embodiment of this aspect of the invention, the means of connecting the product to a predetermined potential have a capacitor, a first pole of which consists of a conductive means connected to a potential and a second pole of which is formed by the product itself.

By virtue of this characteristic, the absence of product in the region of the capacitor eliminates one of the poles of the capacitor and thereby breaks the capacitive connection between the product and the potential; the absence of product facing the first pole is thus easily detected.

Through the location of the conductive means, it is possible to detect the absence of product at a predetermined position in the reservoir, which makes it possible to detect easily the moment when the quantity of product passes through a predetermined value.

In the case of an image formation device, the connection means are advantageously included in the ink ejection means. The connection means are thus common with the ink ejection means, and the connection of the product to the predetermined potential then requires no additional element to be included in the reservoir, nor consequently any additional manufacturing step, which is particularly economical.

The reservoir according to the invention is particularly suited to equipping the above device and makes it possible to obtain advantages analogous to those disclosed above.

The invention also concerns a cartridge including this reservoir.

The present invention also concerns a device for processing an electrical signal including the electrical signal processing means as briefly defined above.

Figure 2:
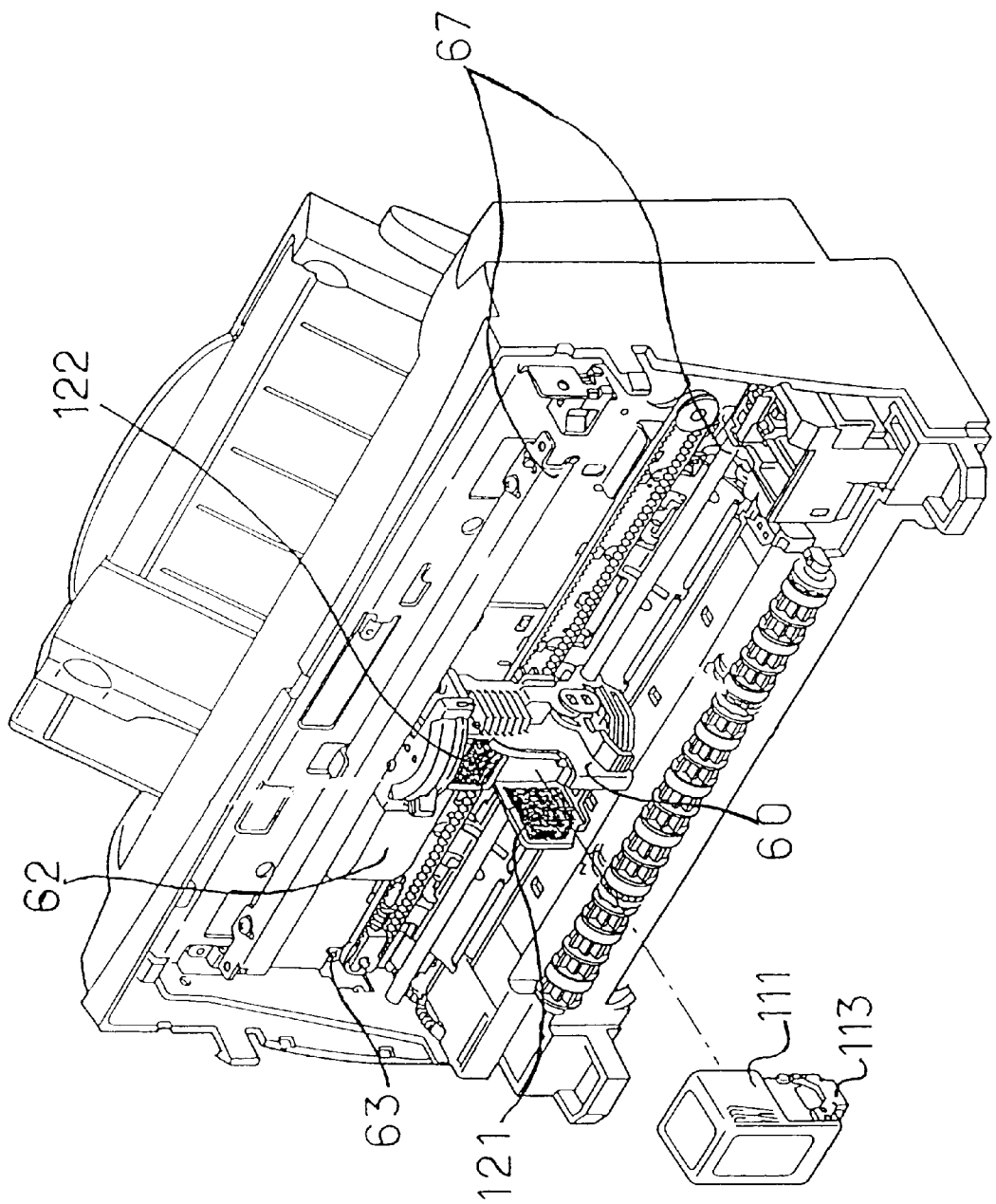
Figure 3:
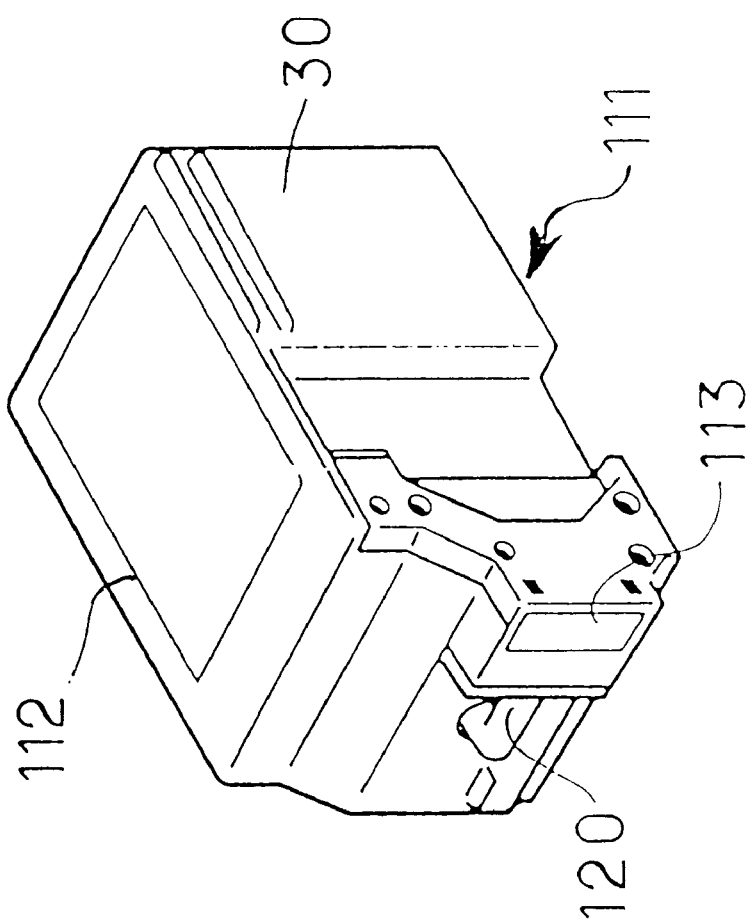
Figure 4:
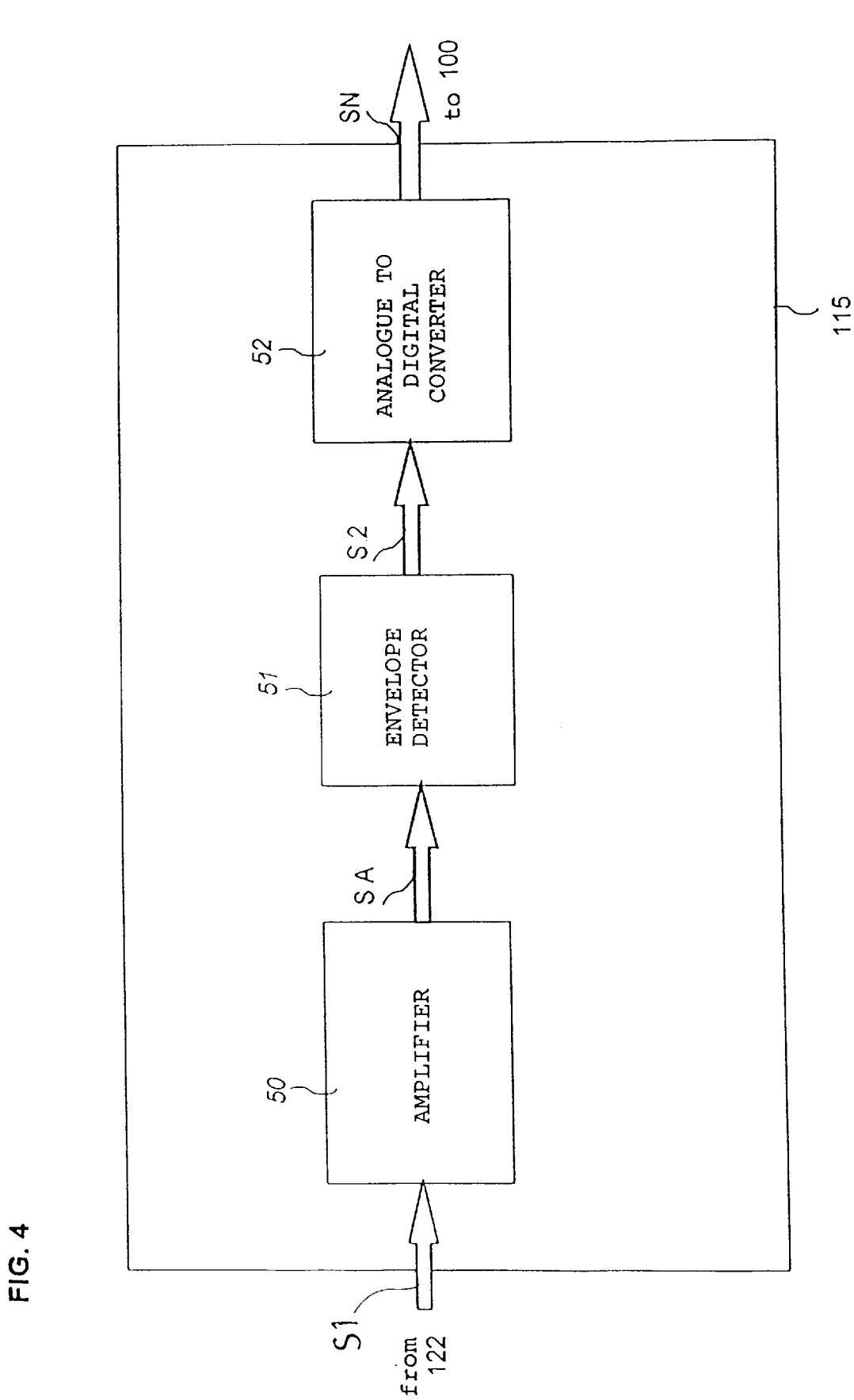
Figure 5:
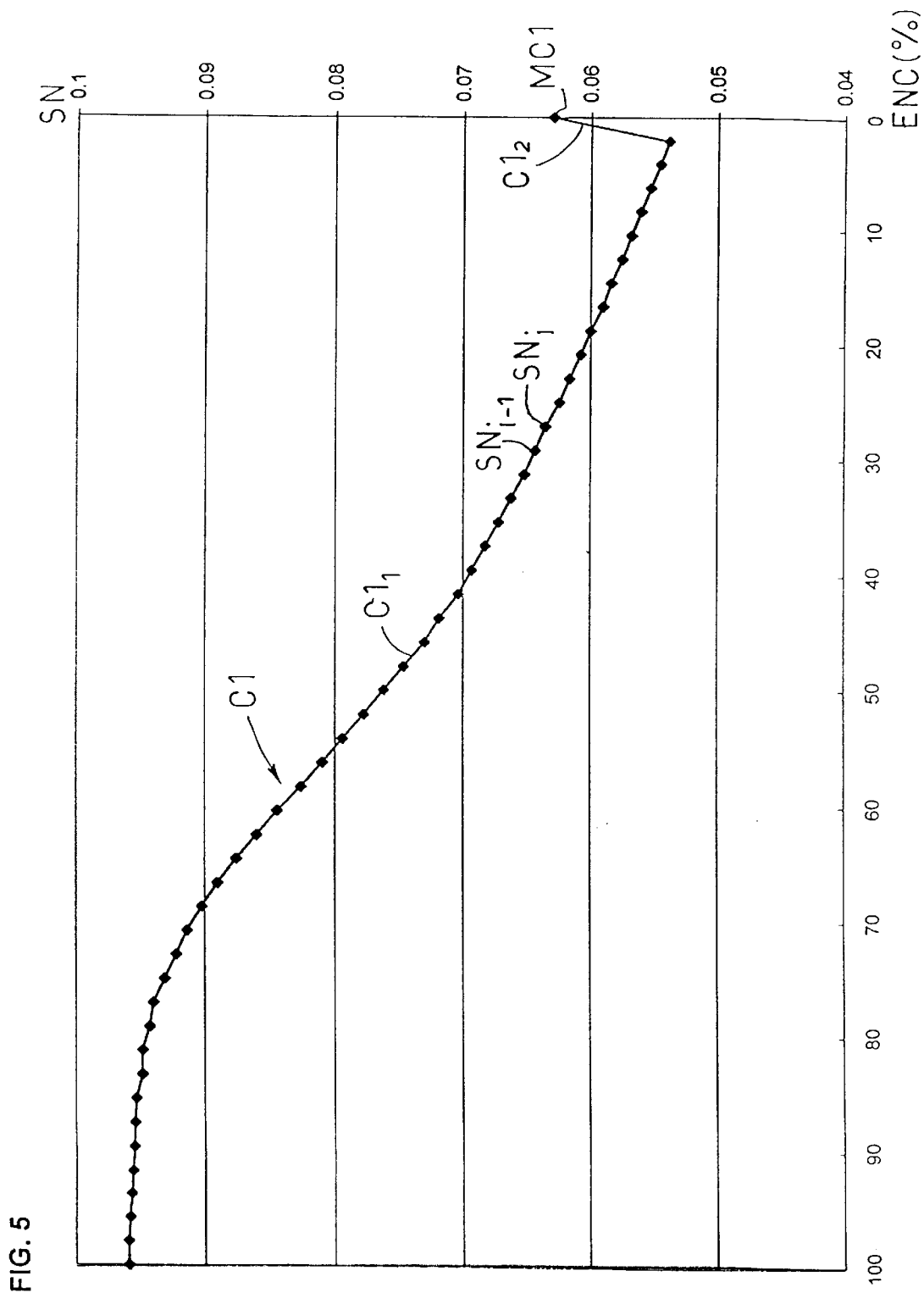
Figure 6:
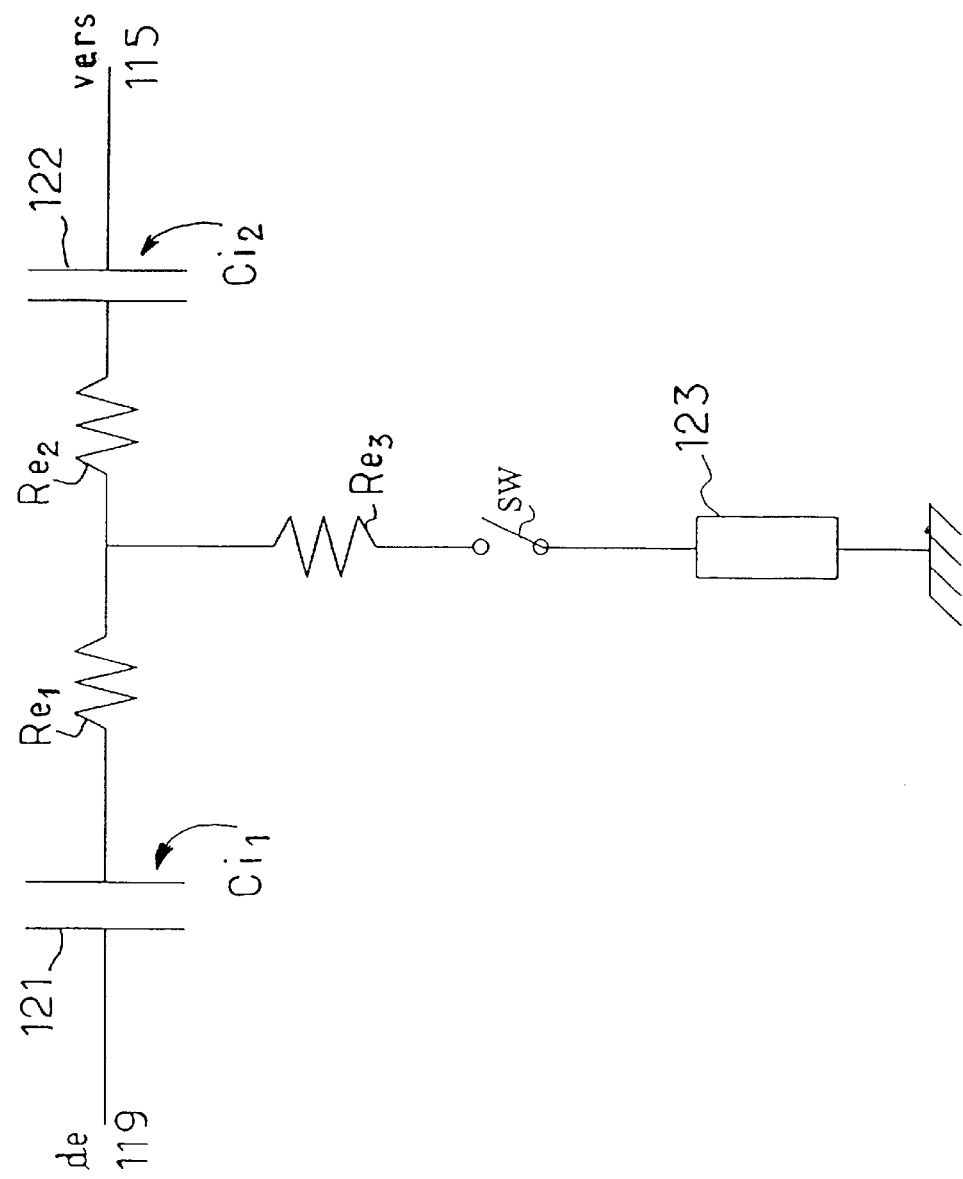
Figure 7:
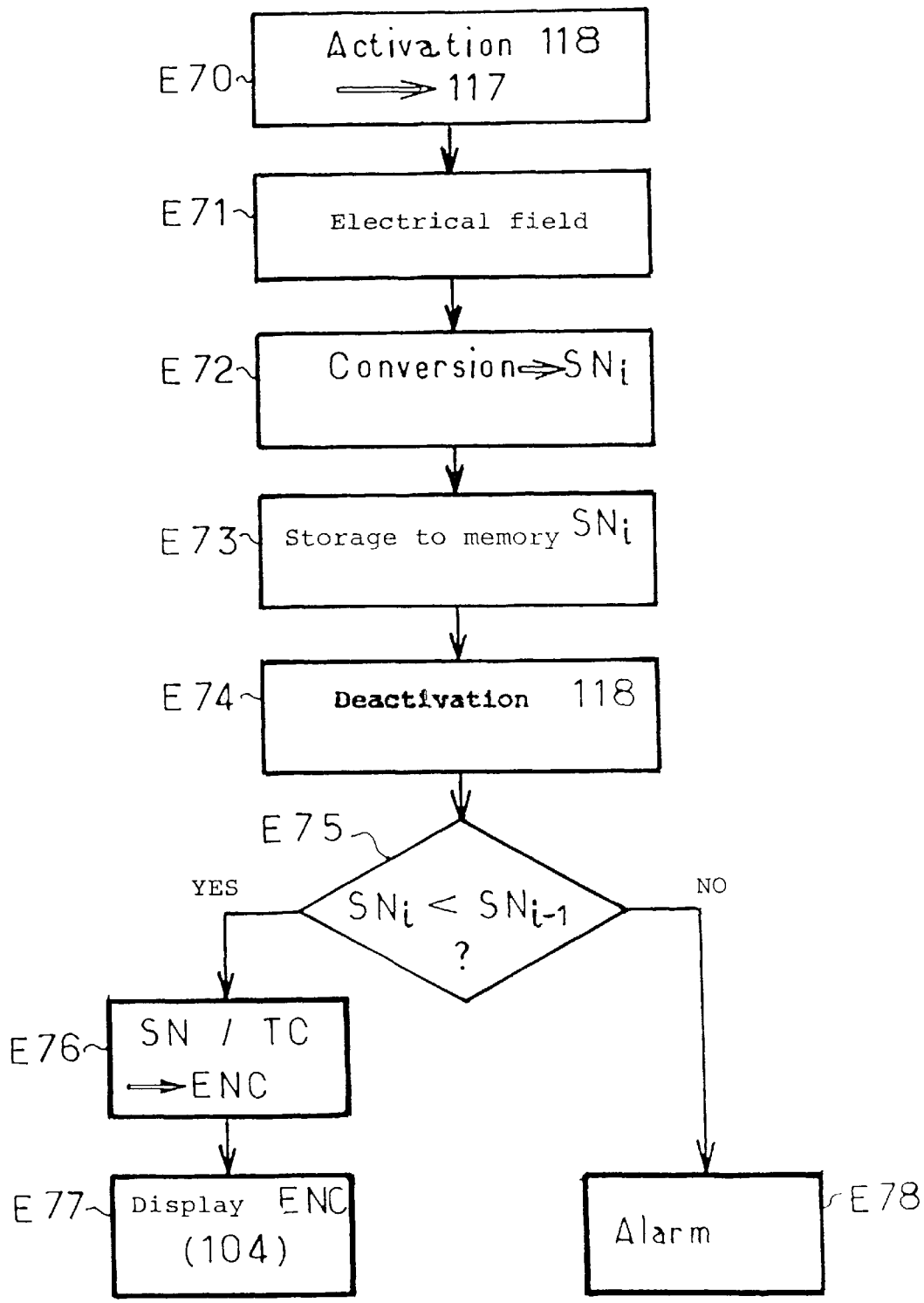
Figure 8:
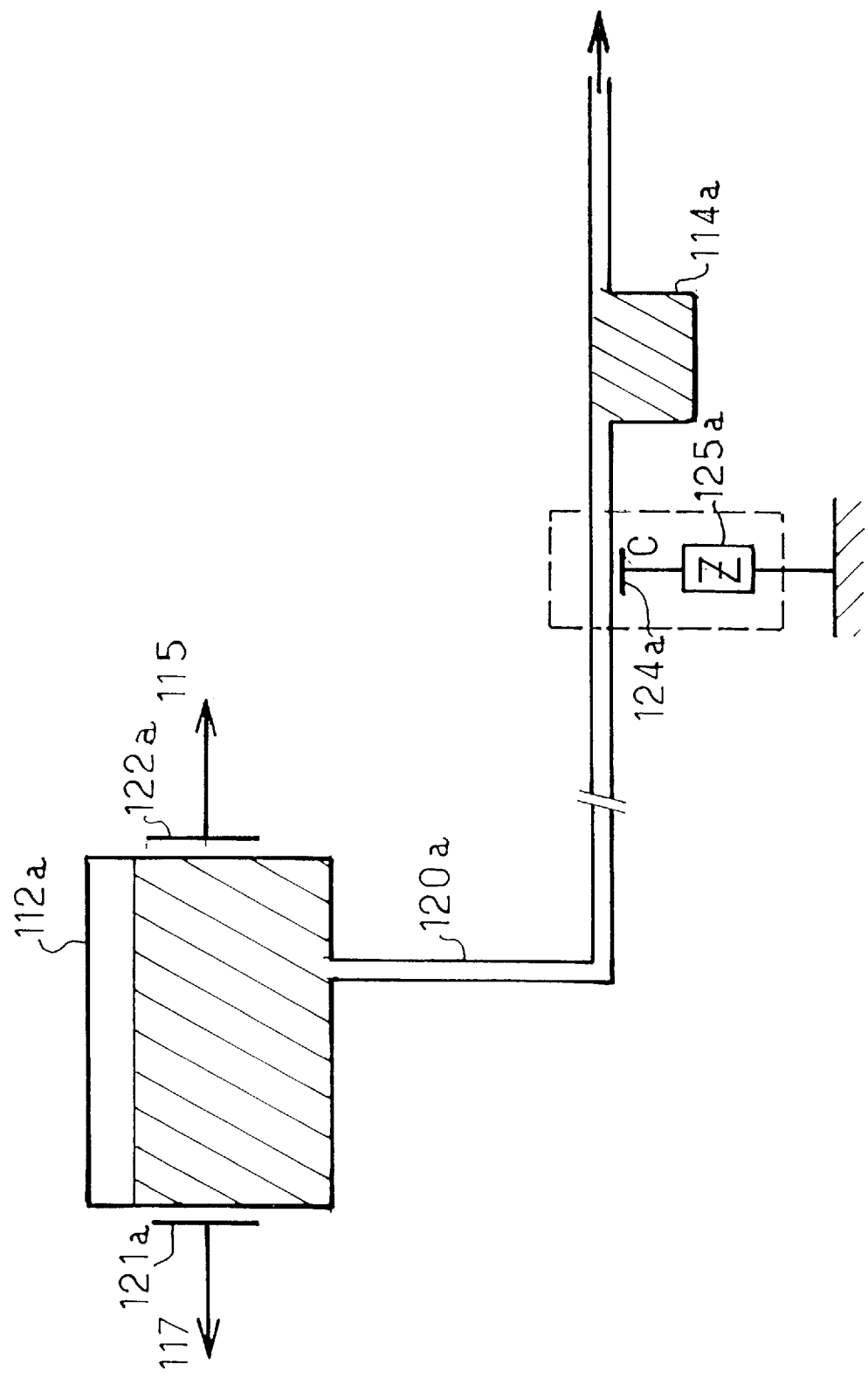
Figure 9:
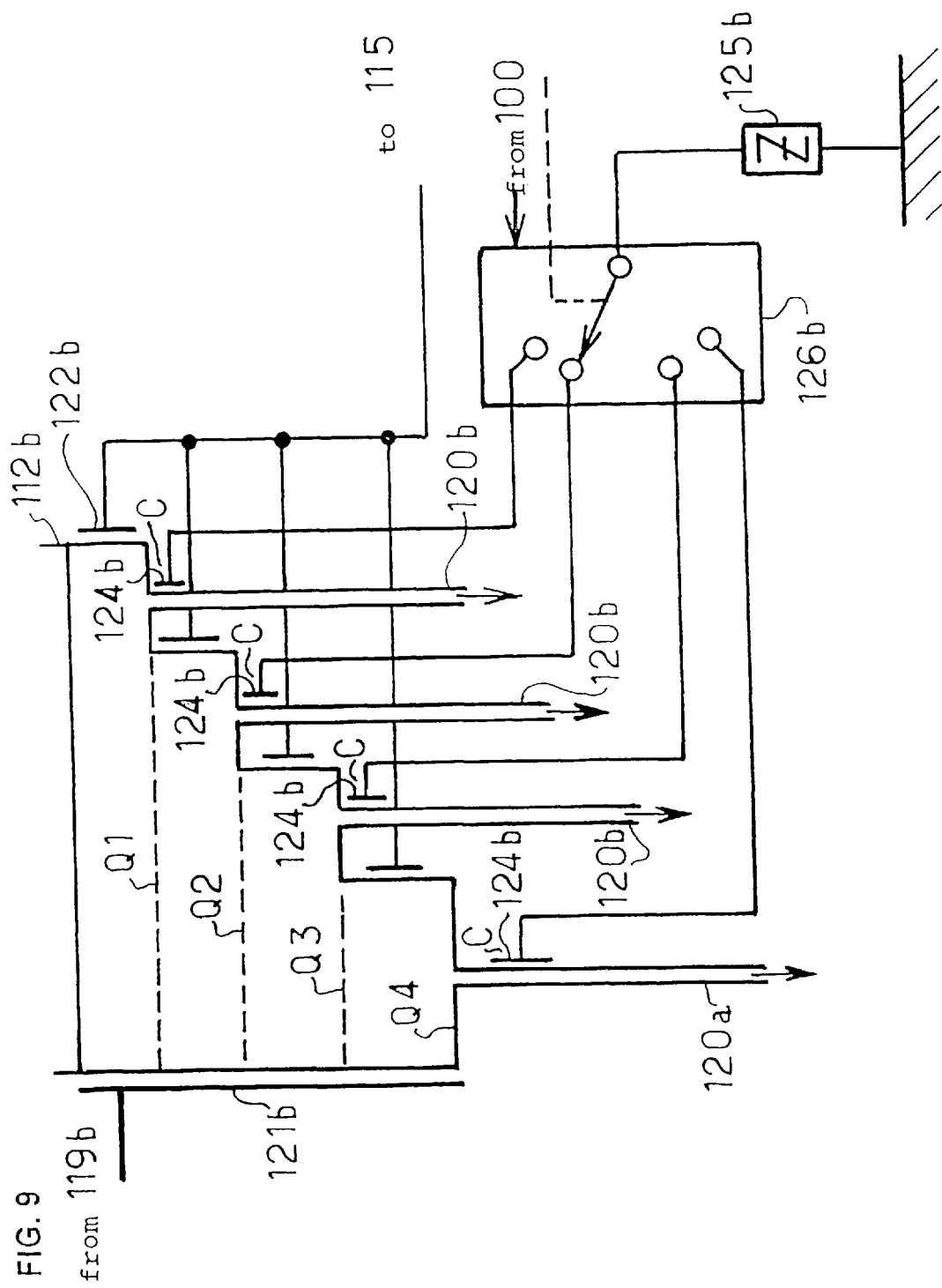
Figure 10:
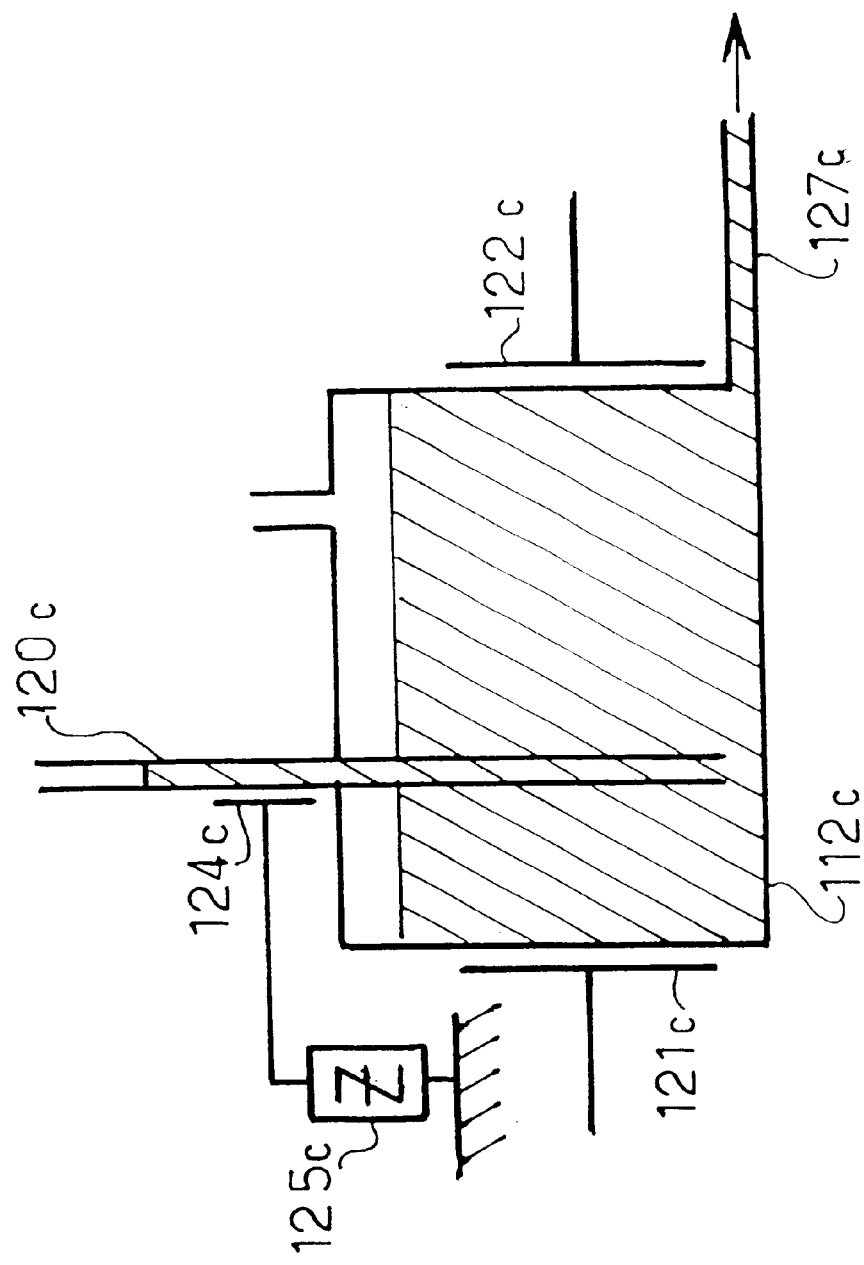

The characteristics and advantages of the present invention will emerge more clearly from a reading of several embodiments illustrated by the accompanying drawings, in which:

FIG. 1 is a block diagram of a first embodiment of an image formation device according to the invention, FIG. 2 is a simplified perspective view of a part of the image formation device according to the first embodiment of the invention, FIG. 3 is a simplified diagrammatic view of an ink reservoir included in the device in FIG. 1, FIG. 4 is a block diagram of a conversion circuit according to the invention, included in the device in FIG. 1, FIG. 5 is an experimental curve representing measurements made by virtue of the invention, FIG. 6 is an equivalent electrical diagram of the ink reservoir included in the device in FIG. 1, FIG. 7 is an ink quantity determination algorithm according to the invention, FIG. 8 is a partial simplified view of a second embodiment of the invention, FIG. 9 is a partial simplified view of a third embodiment of the invention, and FIG. 10 is a partial simplified view of a fourth embodiment of the invention.

According to the first embodiment chosen and depicted in FIG. 1, the invention applies to an image formation device 10 generally included in an image or data processing device 11. The following description refers particularly to an ink jet printer, but the image or data processing device 11 may also for example be a laser printer, or be included in a facsimile machine, or a microcomputer. The components other than those of the image formation device 10 are well known to persons skilled in the art and consequently are neither depicted nor described.

The image formation device 10 receives data to be printed DI by means of a parallel input/output port 107 connected to an interface circuit 106. The circuit 106 is connected to an ink ejection control circuit 110, which controls an ink cartridge 111, via an amplification circuit 114.

The ink cartridge 111 is exchangeable and is mounted on a reciprocating carriage actuated by a motor 102. The ink cartridge 111 includes essentially an ink reservoir 112 and a print head 113 connected to each other by a pipe 120.

The pipe 120 and the print head 113 contain ink coming from the reservoir 112.

The printer also has a principal data processing circuit 100, associated with a read-only memory 103 and a random access memory 109. The read-only memory 103 contains the operating programs of the principal processing circuit 100, whilst the random access memory 109, also associated with the ink ejection control circuit 110, temporarily stores the data DI received by means of the interface 106 and the data processed by the principal processing circuit 100.

The principal processing circuit 100 is connected to a display 104, on which the principal processing circuit 100 controls the display of messages representing the operation of the printer. The principal processing circuit 100 is connected to a keyboard 105, having at least one switch, by means of which the user can transmit operating commands to the printer.

The principal processing circuit 100 is also connected to the motor 102 by means of an amplification circuit 101. The motor 102 moves the carriage which carries the printing cartridge 111. The motor 102 is for example a stepping motor.

The printer described above is conventional and well known to persons skilled in the art. It will therefore not be detailed any further.

According to the invention, the product is connected to a predetermined potential and then an electrical field is generated through the ink and this electrical field is analysed in order to determine the quantity of ink in the reservoir.

Thus, according to the invention, the printer has in general terms means 120, 113 and 123 for connecting the product to a predetermined potential, means 121 and 122 for establishing an electrical field through the product present in the reservoir, means of measuring the electrical field passing through the product in order to produce an electrical signal representing the electrical field, and means 115 and 100 of processing the electrical signal to produce a signal representing the quantity of product present in the reservoir, and to detect the interruption of the connection of the product to the predetermined potential, the said interruption corresponding to a predetermined quantity of product in the reservoir.

In a first embodiment described with the aid of FIGS. 1 to 7, the connection means are included in the ink ejection means and consist overall of the channel 120, the ejection head 113 and the impedance 123. The ink contained in the print head 113, and consequently the ink contained in the pipe 120 and reservoir 112, is connected to the predetermined potential by means of an impedance 123 which consists overall of the impedance of the ink ejection circuit. The connection means are therefore here common to those necessary to the ejection of the ink.

The predetermined potential is here earth and the predetermined quantity is a zero quantity of ink.

The establishment means are here first and second metallic elements 121 and 122 fixed to the carriage moving the cartridge, as will be seen subsequently. As a variant, the first and second metallic elements are fixed to the outside of the walls of the ink cartridge 111. The elements 121 and 122 constitute the poles of a capacitor whose dielectric is formed by the reservoir containing the ink.

The inventors have observed that the electrical characteristics of the dielectric formed by the reservoir containing the ink are variable according to the quantity of ink.

The electrical field is produced by a predetermined alternating excitation signal SE and supplied by an oscillator 117 via a switch 118 and an amplifier 119. The excitation signal is sinusoidal, or as a variant is a square signal, with a frequency substantially equal to 1 MHz.

The principal processing circuit 100 is connected to the switch 118 in order to control it and thus enable the transmission of the alternating signal between the oscillator 117 and the element 121 constituting a pole of the capacitor.

The metallic element 122 is connected to a conversion circuit 115 having an input impedance of 1 megohm, itself connected to the principal processing circuit 100. When the oscillator 117 supplies the metallic element 121 with the signal SE, an electrical field exists between the elements 121 and 122. In response to the electrical field, the amplitude of the electrical signal S1 at the input of the conversion circuit 115 varies; the conversion circuit 115 in response supplies a digital signal SN to the principal processing circuit 100.

As a variant, the principal processing circuit is replaced with a processing circuit internal to a microcomputer, notably if the image formation device 10 is included in this microcomputer.

With reference to FIG. 2, the printing device conventionally includes a carriage 60 for carrying the printing cartridge 111. The carriage is driven in a reciprocating movement on a movement path formed by guide rails 67. The motor 102 drives the carriage 60 by means of a belt device 63. The path of movement of the print head 113 is parallel to a line on a printing medium, not shown, such as a sheet of paper.

The carriage 60 carries the metallic elements 121 and 122, situated in the vicinity of the location designed to receive the cartridge 111.

A flexible cable 62 connects the amplification circuit 114 to the ink cartridge 111. The cable 62 also connects the amplifier 119 to the metallic element 121, and the metallic element 122 to the detection circuit 115.

With reference to FIG. 3, the printing cartridge 111 includes the ink reservoir 112 which has a plastic envelope 30, which is for example filled with a spongy body soaked with ink.

The connecting pipe 120 connects the reservoir 112 to the print head 113.

According to FIG. 4, the conversion circuit extracts the amplitude of the signal received by the metallic element 122 in response to the excitation signal SE. The conversion circuit 115 includes an amplifier 50 with an input impedance of 1 megohm connected to an envelope detector 51 used to determine the amplitude of the analogue signal which is supplied to it as an input. The envelope detector 51 is connected to an analogue to digital converter 52, an output of which is connected to the processing circuit 100.

The metallic element 122 supplies the electrical signal S1 to the amplifier 50, which amplifies the electrical signal S1 in current and voltage so as to facilitate subsequent processing. The electrical signal S1 is a function of the capacitance existing between the two metallic elements 121 and 122 at the time of measurement.

The amplifier 50 supplies the amplified signal SA to the envelope detector 51, which determines the amplitude of the amplified signal.

The signal S2 at the output of the envelope detector 51 is supplied to the converter 52. The converter 52 converts the analogue signal S2 into the digital signal SN in order to transmit it to the processing circuit 100. A calibration table or mapping table TC stored in memory 103 respectively maps ink quantity values, for example expressed as a percentage of a maximum quantity, to the amplitudes of the digital signal SN supplied by the converter 52.

FIG. 5 is an experimental curve showing the results obtained with the invention. The quantity of ink ENC contained in the reservoir 112, expressed as a percentage of the maximum quantity, is on the X axis, and the value of the electrical signal SN, expressed in volts, supplied by the circuit 115, is on the Y axis.

The curve C1 represents the results obtained with an excitation signal SE having a frequency of around 1 MHz. Measured values $SN_i$ and $SN_{i-1}$ are successive values of the signal SN, the subscript i representing the order of the measurements.

As the quantity of ink decreases in the reservoir 112, the measured value of the signal SN decreases. When the ink disappears in the pipe 120, that is to say when the quantity of ink ENC is close to zero, the measured value of the signal SN increases abruptly.

It will be noted that the quantity of ink considered here is the quantity of ink actually usable for printing; it is possible that the quantity remaining in the reservoir is slightly greater, whilst being insufficient to be able to print a document.

The curve C1 thus has two parts. The first part $C1_1$ of the curve corresponds to the fall in the signal SN, for ink quantity values ENC lying between 100 percent and approximately 2 percent. The second part $C1_2$ of the curve is the rise of the signal SN up to a maximum value MC1, for ink quantity values lying between approximately 2 percent and 0 percent.

FIG. 6 is an electrical diagram representing the electrical behavior of the ink reservoir 112 during an ink quantity measurement carried out according to the invention.

Starting from the metallic element 121, the reservoir 112 is equivalent to a first capacitor $Ci_1$ representing the capacitance existing between the metallic element 121, the wall of the reservoir 112 and the ink contained in the reservoir. The capacitor $Ci_1$ is connected to two resistors $Re_1$ and $Re_2$ in series, representing the equivalent resistance of the ink contained in the reservoir. The resistances $Re_1$ and $Re_2$ have the same value, which is relatively low, since the ink is conductive.

The resistor $Re_2$ is connected to a second capacitor $Ci_2$, which represents the capacitance existing between the ink contained in the reservoir, the wall of the reservoir and the metallic element 122.

A resistor $Re_3$ is connected to the mid-point of the resistors $Re_1$ and $Re_2$, and to a switch SW which represents the presence or absence of ink in the pipe 120, depending on whether the switch SW is closed or open, respectively.

The switch SW is connected to the impedance 123 representing the impedance existing between the ink contained in the print head and earth.

When the excitation signal SE is applied to the metallic element 121, the behaviour of the circuit depends on the quantity of ink present in the reservoir 112 and on the presence or absence of ink in the pipe 120.

In particular, as the quantity of ink in the reservoir decreases, the capacitances $Ci_1$ and $Ci_2$ decrease and the resistances $Re_1$, $Re_2$ and $Re_3$ increase.

In addition, the presence of ink in the pipe 120 corresponds to the closure of the switch SW, and correlatively the absence of ink in the pipe 120 corresponds to the opening of the switch SW.

As long as there remains some ink in the reservoir 112, some of this ink enters the pipe 120, leading to the closure of the switch SW. When there is no more ink in the reservoir 112, the ink also disappears from the pipe 120, which causes the opening of the switch SW.

The first part $C1_1$ of the curve C1 (FIG. 5) corresponds to the situation in which the capacitances $Ci_1$ and $Ci_2$ decrease, the resistances $Re_1$, $Re_2$ and $Re_3$ increase and the switch SW is closed.

The second part $C1_2$ of the curve C1 (FIG. 5) corresponds to the situation in which the switch SW is open. By detecting the passage from the first to the second part of the curve, it is possible accurately to detect the absence of ink in the reservoir 112.

The opening of the switch SW corresponds in the first embodiment to a zero quantity of ink in the reservoir; however, it is possible to design a reservoir where the interruption of the connection of the ink to the predetermined potential corresponds to another quantity of ink.

With reference to FIG. 7, an algorithm according to the invention is stored in the read-only memory 103 of the printing device in order to be implemented by the principal processing means 100. The algorithm includes steps E70 to E78, which are run through periodically, for example before the printing of a document. The algorithm makes it possible to use the electrical signals coming from the circuits 115 in order to determine the quantity of ink present in the ink reservoir 112 and accurately detect a predetermined quantity, here the absence of ink in the reservoir 112.

A first step consists of connecting the ink to the predetermined potential, here earth. In this embodiment, the ink is already connected to earth by means of the ejection circuit.

The step E70 consists of activating the switch 118 in order to enable the excitation signal SE generated by the oscillator 117 to pass to the amplifier 119. The metallic element 121 is then supplied with the excitation signal SE.

The electrical field produced in the ink reservoir 112 by the excitation signal SE is picked up by the metallic element 122 at the following step E71. The metallic element 122 supplies the signal S1 to the conversion circuit 115, which in turn supplies the value $SN_i$ of the digital signal S1 to the processing circuit 100 at step E72.

The following step E73 is the storage of the value $SN_i$ in the register $SN_i$ of the RAM memory 109. The memory 109 can contain all the measured values $SN_i$ relating to a given ink cartridge, or only a predetermined number of the last measured values. The measured values are erased from the memory 109 when the ink cartridge is replaced by a new cartridge, or when it is filled with ink.

The step E74 is the deactivation of the switch 118 in order to open the circuit between the oscillator 117 and the metallic element 121, so that the signal SE no longer supplies the metallic element 121.

The step E74 is followed by the step E75, during which the last measured value $SN_i$ is compared with at least the previously measured and stored value $SN_{i-1}$. The comparison consists of calculating the difference between the value $SN_i$ and $SN_{i-1}$, or calculating the slope of the curve of the measured values, for example by a differential calculation on the measured values. The purpose of the step E75 is to determine whether the measured value $SN_i$ is situated in the first or the second part of the curve C1 (FIG. 5).

If the measured value $SN_i$ is less than the previous value $SN_{i-1}$, which corresponds to the first part of the curve C1, the algorithm passes to the step E76, during which the quantity of ink ENC present in the reservoir 112 is determined. The step E76 consists of seeking in the mapping table TC, in the register TC of the memory 103, the stored amplitude value closest to the measured value $SN_i$, and then extracting from the mapping table TC the corresponding ink quantity value.

At the step E77, a representation of the extracted ink quantity ENC is displayed on the display 175 for the user. The representation of the quantity of ink is displayed either in numerical form or in the form of a diagram.

As a variant, the value of the ink quantity is transmitted to a remote device, such as a microcomputer, by means of the input/output port 107. The microcomputer then displays a representation of the ink quantity for the user, in numerical form or in diagram form.

If at step E75 the measured value $SN_i$ is greater than the previous value $SN_{i-1}$, this means that the value $SN_i$ is situated in the second part of the curve C1, then the algorithm passes to step E78, where an alarm is activated to indicate the absence of ink in the reservoir. The alarm consists for example of a message displayed on the display 107 and intended for the user.

As a variant, the alarm is transmitted to a remote device, such as a microcomputer, by means of the input/output port 107. The microcomputer then displays an alarm message.

Where the invention is applied to a facsimile machine, for example, the step E78 can be followed by the storage of the data received for them to be printed subsequently, or the sending of a signal to the remote terminal in order to indicate that the facsimile machine is no longer able to receive data.

FIG. 8 depicts another embodiment of the invention, implementing two other aspects of the invention. According to one of these aspects, the connection of the product to the predetermined potential is a connection of the capacitive type depicted diagrammatically under the reference C, advantageously avoiding direct contact of the product with a part at a potential. According to the other aspect of the invention, a reserve 114a is provided downstream of the point of connection of the product to a predetermined potential, so that the predetermined quantity of product is not zero but is equal to the quantity of product present in the reserve.

The elements analogous to those of the first embodiment bear identical numerical references, to which the letter "a" is added.

The principal reservoir 112a is connected to a reserve 114a by means of a pipe 120a. A metallic piece 124a disposed on the pipe 120a is connected to an impedance 125a, itself connected to earth.

Metallic plates 121a and 122a are disposed on each side of the principal reservoir 112a and are connected respectively to a supply circuit and a processing circuit both identical to those described above, these connections being depicted diagrammatically in FIG. 8 by the arrows 117 and 115.

The means of connecting the product to the predetermined potential include a capacitor, a first pole of which consists of a conductive means, here the metallic piece 124a, and a second pole of which consists of the product, here the product situated in the channel 120a. The dielectric of the capacitor consists of the material of the channel, here the plastic material.

When there is no longer any product in the channel 120a, the capacitive-type connection is broken, fulfilling the role of a switch. It is then known that there is no longer any product in the channel 120a, that the principal reservoir 112a is empty and that the quantity of product remaining in the circuit is that present in the reservoir 114a.

FIG. 9 depicts another embodiment implementing another aspect of the invention, according to which several predetermined quantities of product can be measured by means of the detection of interruption of connection of the product to the predetermined potential.

The elements analogous to those of the first embodiment bear identical numerical references, to which the letter "b" is added. The reservoir is here a liquid reservoir, associated with processing means 115 and 100 in accordance with those described above.

In accordance with this aspect of the invention:
on the one hand the reservoir has several channels, here four channels 120b, for discharging liquid. By its positioning on the reservoir, each of these channels corresponds to a quantity $Q_1$ to $Q_4$ of product present in the reservoir;
on the other hand, a means of connecting the product to a predetermined potential is associated with each of the channels 120b. Each of these connection means is thus associated with a quantity of product $Q_1$ to $Q_4$.

Each of the connection means has a capacitor C of the same type as described with the help of FIG. 8. A first pole of the capacitor consists of a conductive means, here a lug 124b, and a second pole consists of the product, here the product situated in the channel 120b under consideration. The dielectric of the capacitor consists of the material of the channel, here the plastic material. The first pole of each of the capacitors is connected to a selector 126b.

The selector 126b is controlled by the principal processing circuit 100a and connects one of the metallic pieces 124b to a predetermined potential, here earth, by means of an impedance 125b.

Metallic elements 121b and 122b form the poles of a capacitor, whose dielectric is formed by the reservoir containing the product. The plate 121b is connected to an amplifier 119b, itself connected to a sinusoidal signal generator, not shown. The plate 122b is connected to the processing circuit 115.

With this embodiment, four quantities of product $Q_1$, $Q_2$, $Q_3$ and $Q_4$ can be measured with precision, by successively connecting each of the channels 120b to earth and detecting any interruption in the connection of the product to earth. When there is no longer any product in the channel 120b under consideration, the capacitive connection breaks, thus fulfilling the role of a switch. The intermediate quantities can be determined with a calibration table.

FIG. 10 depicts a fourth embodiment of the invention, according to which the means of connecting the product to a predetermined potential is associated with a capillary tube.

The elements analogous to those of the first embodiment bear identical numerical references, to which the letter "c" is added.

A reservoir 112c contains a liquid in which a capillary tube 120c is immersed. The product is connected to a predetermined potential by means of a metallic piece 124c situated at a predetermined height on the capillary tube, and an impedance 125c.

The means of connecting the product to the predetermined potential includes a capacitor, a first pole of which consists of the metallic piece 124c, and a second pole of which consists of the product present in the capillary tube, opposite the metallic piece 124c.

The positioning of the metallic piece 124c on the capillary tube corresponds to a predetermined quantity of product in the reservoir.

Metallic plates 121c and 122c are connected respectively to a supply circuit and a processing circuit, in a similar manner to the previous embodiments. The liquid leaves the reservoir through a pipe 127c.

It will be noted that the capillary tube used in the context of the invention is not the tube by which the liquid leaves the reservoir.

In these examples, excellent effects can be obtained particularly in a recording head and a recording apparatus of a system in which a means (for example, an electro-thermal converting element, laser beam, etc.) for generating thermal energy as energy used in discharging an ink is equipped, and the change of state of the ink is caused to take place by the thermal energy, among the ink-jet recording systems. According to such a system, recording high in density and resolution can be achieved.

With respect to its typical structure and principle, it is preferred to employ the basic-principle disclosed in, for example, U.S. Pat. Nos. 4,723,129 and 4,740,796. This system can be applied to both so-called "On-Demand" type and "Continuous" type structures. This sytem is advantageous to the On-Demand type in particular because an electro-thermal converting element disposed to align to a sheet or a liquid passage in which a liquid (ink) is held is applied with at least one drive signal which corresponds to information to be recorded and which enables the temperature of the electro-thermal converting element to be rapidly raised higher than a nucleate boiling point, so that thermal energy is generated in the electro-thermal converting element and film boiling is caused to take place on the surface of the recording head which is heated. As a result, bubbles can be respectively formed in the liquid (ink) in response to the drive signals. Owing to the enlargement and contraction of the bubbles, the liquid (ink) is discharged through the discharging orifice, so that at least one droplet is formed. In a case where the aforesaid drive signal is made to be a pulse signal, a further satisfactory effect can be obtained in that the bubbles can immediately and properly be enlarged/contracted and the liquid (ink) can be discharged while exhibiting excellent responsibility. It is preferable to use a drive signal of the pulse signal type disclosed in U.S. Pat. Nos. 4,463,359 and 4,345,262. Furthermore, in a case where conditions for determining the termperature rise ratio on the aforesaid heating surface disclosed in U.S. Pat. No. 4,313,124 are adopted, a further excellent recording operation can be performed.

In addition to the structure (a linear liquid passage or a perpendicular liquid passage) of the recording head formed by combining the discharging orifice, the liquid passage and the electro-thermal converting element as disclosed in the aforesaid specifications, a structure disclosed in U.S. Pat. Nos. 4,558,333 and 4,459,600 in which the heated portion is disposed in a bent portion is included in the scope of the present invention.

Furthermore, the present invention can effectively be embodied in a structure in which a common slit is made to be the discharge portion of a plurality of electro-thermal converting elements and which is disclosed in Japanese Patent Application Laid Open No. 59-123670 and a structure in which an opening for absorbing thermal energy pressure waves is defined to align to the discharge part and which is disclosed in Japanese Patent Application Laid-Open No. 59-138461. Namely, according to the present invention, recording operation can be performed surely and effectively irrespective of the form of the recording head.

The present invention may be applied to a full line type recording head having a length which corresponds to the maximum width of the recording medium, which can be recorded by the recording apparatus.

Such a recording head may be either a structure capable of realizing the aforesaid length and formed by combining a plurality of recording heads or a structure formed by an integrally formed recording head.

In addition, the present invention can also be effectively applied to a recording head fixed to the body of the apparatus, a structure having an interchangeable chip type recording head which can be electrically connected to the body of the apparatus or to which an ink can be supplied from the body of the apparatus when it is mounted on the body of the apparatus, or a cartridge type recording head provided with an ink tank integrally formed to the recording head itself among the above-exemplified serial type recording heads.

It is preferable to additionally provide a recording head recovery means and an auxiliary means of the recording apparatus according to the present invention because the effects of the present invention can further be stabilized. Specifically, an effect can be obtained in that the recording operation can be stably performed by providing a recording head capping means, a cleaning means, a pressurizing or sucking means, an electro-thermal converting element or another heating device or an auxiliary heating means formed by combining the aforesaid elements and by performing a preliminary discharge mode in which a discharge is performed individually from the recording operation.

Although the embodiments of this invention, which have been described above, used the liquid inks, inks which are solid at a temperature lower than room temperature, but are softened or liquefied at room temperature may be used. In the aforesaid ink-jet system, the temperature of an ink is usually controlled in a range from 30° C. to 70° C. so as to adjust the viscosity of the ink within a stable discharge range. Therefore, it is only necessary to use inks which are liquefied in response to a record signal applied. Furthermore, inks, the temperature rise of which is prevented by positively using the temperature rise due to the thermal energy as energy of state change from the solid state to the liquid state of ink or inks which are solidified when it is allowed to stand in order to prevent the evaporation of ink may be used. That is, inks which are liquefied by thermal energy applied in response to the record signal and discharged as ink droplets or inks which already begin to solidify when they reach the recording medium may be employed in the present invention. In this case, an ink may be, in the form of liquid or solid, held by a recess of a porous sheet or a through hole as disclosed in Japanese Patent Application Laid-Open No.54-56847 or 60-71260 and disposed to confront the electro-thermal converting element. It is most preferable for the above-described inks that an ink be discharged by the aforesaid film boiling method.

Furthermore, the ink-jet recording apparatus according to this invention may be in the form, in addition to that used as an image-output terminal for information processing equipment such as a computer, of a copying machine combined with a reader and moreover, of a facsimile terminal equipment having a transmit-receive function or the like.

As has been described above, the present invention can provide ink-jet recording apparatuses, which are cheap and small in size and permit speedy recording of clear and sharp images free from formation of inadequate feathering at boundaries between inks of different colors, without making any changes in constructions of existent apparatuses.

Naturally the present invention is in no way limited to the embodiments described and depicted, but, quite the contrary, encompasses any variant within the reach of persons skilled in the art.

What is claimed is:

1. A method of determining a quantity of product present in a reservoir, the reservoir being connected to an ejector which ejects the product, said method comprising the steps of:

connecting the product to a predetermined potential, said connecting being effected through the ejector and a resulting connection being of a capacitive type, establishing an electrical field through the product present in the reservoir, measuring the electrical field passing through the product, thereby producing an electrical signal representing the electrical field, and processing the electrical signal to produce a signal representing the quantity of the product present in the reservoir, and to detect an interruption of the connection of the product to the predetermined potential, said interruption corresponding to a predetermined quantity of the product present in the reservoir.

2. A method according to claim 1, wherein said step of processing the electrical signal includes the steps of:

detecting the amplitude of the electrical signal;

storing said amplitude in a memory; and comparing said amplitude with at least one amplitude previously detected and stored.

3. A method according to claim 2, further comprising the step of indicating detection of said predetermined quantity of the product present in the reservoir.

4. A method according to claim 2, further comprising the step of transmitting a signal representing detection of said predetermined quantity of the product present in the reservoir to a remote device, thereby causing said remote device to display a message representing the detection of said predetermined quantity.

5. A method according to claim 2, wherein said processing step includes the steps of:

detecting an amplitude of the electrical signal, and producing the signal representing the quantity of the product from a value given by a calibration table according to the amplitude detected.

6. A method according to claim 2, further comprising the step of displaying a representation of the quantity of the product present in the reservoir.

7. A method according to claim 2, further comprising the step of transmitting the signal representing the quantity of the product present in the reservoir to a remote device, thereby causing said remote device to display a representation of the quantity of the product present in the reservoir.

8. A method according to claim 2, wherein the product is ink.

9. A method according to claim 1, further comprising the step of indicating detection of said predetermined quantity of the product present in the reservoir.

10. A method according to claim 9, further comprising the step of transmitting a signal representing detection of said predetermined quantity of the product present in the reservoir to a remote device, thereby causing said remote device to display a message representing the detection of said predetermined quantity.

11. A method according to claim 9, wherein said processing step includes the steps of:

detecting an amplitude of the electrical signal, and producing the signal representing the quantity of the product from a value given by a calibration table according to the amplitude detected.

12. A method according to claim 9, further comprising the step of displaying a representation of the quantity of the product present in the reservoir.

13. A method according to claim 9, further comprising the step of transmitting the signal representing the quantity of the product present in the reservoir to a remote device, thereby causing said remote device to display a representation of the quantity of the product present in the reservoir.

14. A method according to claim 1, further comprising the step of transmitting a signal representing detection of said predetermined quantity of the product present in the reservoir to a remote device, thereby causing said remote device to display a message representing the detection of said predetermined quantity.

15. A method according to claim 14, wherein said processing step includes the steps of:

detecting an amplitude of the electrical signal, and producing the signal representing the quantity of the product from a value given by a calibration table according to the amplitude detected.

16. A method according to claim 14, further comprising the step of displaying a representation of the quantity of the product present in the reservoir.

17. A method according to claim 14, further comprising the step of transmitting the signal representing the quantity of the product present in the reservoir to a remote device, thereby causing said remote device to display a representation of the quantity of the product present in the reservoir.

18. A method according to claim 1, wherein said processing step includes the steps of:

detecting an amplitude of the electrical signal, and producing the signal representing the quantity of the product from a value given by a calibration table according to the amplitude detected.

19. A method according to claim 18, further comprising the step of displaying a representation of the quantity of the product present in the reservoir.

20. A method according to claim 18, further comprising the step of transmitting the signal representing the quantity of the product present in the reservoir to a remote device, thereby causing said remote device to display a representation of the quantity of the product present in the reservoir.

21. A method according to claim 1, further comprising the step of displaying a representation of the quantity of the product present in the reservoir.

22. A method according to claim 21, further comprising the step of transmitting the signal representing the quantity of the product present in the reservoir to a remote device, thereby causing said remote device to display a representation of the quantity of the product present in the reservoir.

23. A method according to claim 1, further comprising the step of transmitting the signal representing the quantity of the product present in the reservoir to a remote device, thereby causing said remote device to display a representation of the quantity of the product present in the reservoir.

24. A method according to claim 1, wherein the product is ink.

25. A device for determining a quantity of product present in a reservoir, the reservoir being connected to an ejector which ejects the product, said device comprising:
- a connecting unit which connects the product to a predetermined potential, the connecting being effected through the ejector and a resulting connection being of a capacitive type,
- an establishing unit which establishes an electrical field through the product present in the reservoir,
- a measuring unit which measures the electrical field passing through the product to produce an electrical signal representing the electrical field, and
- a processing unit which processes the electrical signal to produce a signal representing the quantity of the product present in the reservoir and to detect an interruption of the connection of the product to the predetermined potential, said interruption corresponding to a predetermined quantity of the product in the reservoir.

26. A device according to claim 25, wherein said establishing unit includes a first metallic element and a second metallic element disposed outside the reservoir.

27. A device according to claim 26, wherein the first metallic element and the second metallic element form poles of a capacitor whose dielectric is formed by the reservoir containing the product.

28. A device according to claim 27, wherein said establishing unit is fed by an oscillator connected thereto by a switch.

29. A device according to claim 27, wherein the electrical field is produced by a high-frequency alternating signal.

30. A device according to claim 27, wherein the electrical field is produced by an alternating signal with a frequency approximately 1 MHz.

31. A device according to claim 27, wherein said measuring unit includes an envelope detector and an analog-to-digital converter for producing a digital signal representing an amplitude of the electrical signal.

32. A device according to claim 27, further comprising a reserve downstream of the of connection of the product to the predetermined potential with respect to a flow direction of the product from the reservoir.

33. A device according to claim 27, further comprising a display which displays a representation of the predetermined quantity of the product present in the reservoir.

34. A device according to claim 27, further comprising a transmitter which transmits a signal representing the predetermined quantity of the product present in the reservoir to a remote device, thereby causing said remote device to display a message representing the predetermined quantity of the product present in the reservoir.

35. A device according to claim 27, further comprising a display which displays a representation of the quantity of the product present in the reservoir.

36. A device for determining the quantity of product in a reservoir according to claim 27, wherein the product is ink, the device being included in an image formation device.

37. A device according to claim 26, wherein said establishing unit is fed by an oscillator connected thereto by a switch.

38. A device according to claim 26, wherein the electrical field is produced by a high-frequency alternating signal.

39. A device according to claim 26, wherein the electrical field is produced by an alternating signal with a frequency approximately 1 MHz.

40. A device according to claim 26, wherein said measuring unit includes an envelope detector and an analog-to-digital converter for producing a digital signal representing an amplitude of the electrical signal.

41. A device according to claim 26, further comprising a reserve downstream of the connection of the product to the predetermined potential with respect to a flow direction of the product from the reservoir.

42. A device according to claim 26, further comprising a display which displays a representation of the predetermined quantity of the product present in the reservoir.

43. A device according to claim 26, further comprising a transmitter which transmits a signal representing the predetermined quantity of the product present in the reservoir to a remote device, thereby causing said remote device to display a message representing the predetermined quantity of the product present in the reservoir.

44. A device according to claim 26, further comprising a display which displays a representation of the quantity of the product present in the reservoir.

45. A device for determining the quantity of product in a reservoir according to claim 26, wherein the product is ink, the device being included in an image formation device.

46. A device according to claim 25, wherein said establishing unit is fed by an oscillator connected thereto by a switch.

47. A device according to claim 46, wherein the electrical field is produced by a high-frequency alternating signal.

48. A device according to claim 46, wherein the electrical field is produced by an alternating signal with a frequency approximately 1 MHz.

49. A device according to claim 46, wherein said measuring unit includes an envelope detector and an analog-to-digital converter for producing a digital signal representing an amplitude of the electrical signal.

50. A device according to claim 46, further comprising a reserve downstream of the connection of the product to the predetermined potential with respect to a flow direction of the product from the reservoir.

51. A device according to claim 46, further comprising a display which displays a representation of the predetermined quantity of the product present in the reservoir.

52. A device according to claim 46, further comprising a transmitter which transmits a signal representing the predetermined quantity of the product present in the reservoir to a remote device, thereby causing said remote device to display a message representing the predetermined quantity of the product present in the reservoir.

53. A device according to claim 46, further comprising a display which displays a representation of the quantity of the product present in the reservoir.

54. A device for determining the quantity of product in a reservoir according to claim 46, wherein the product is ink, the device being included in an image formation device.

55. A device according to claim 25, wherein the electrical field is produced by a high-frequency alternating signal.

56. A device according to claim 25, wherein the electrical field is produced by an alternating signal with a frequency approximately 1 MHz.

57. A device according to claim 25, wherein said measuring unit includes an envelope detector and an analog-to-digital converter for producing a digital signal representing an amplitude of the electrical signal.

58. A device according to claim 25, further comprising a reserve downstream of the connection of the product to the predetermined potential with respect to a flow direction of the product from the reservoir.

59. A device according to claim 25, further comprising a display unit which displays a representation of the predetermined quantity of the product present in the reservoir.

60. A device according to claim 25, further comprising a transmitter which transmits a signal representing the predetermined quantity of the product present in the reservoir to a remote device, thereby causing said remote device to display a message representing the predetermined quantity of the product present in the reservoir.

61. A device according to claim 25, further comprising a display which displays a representation of the quantity of the product present in the reservoir.

62. A device according to claim 25, wherein the product is ink.

63. A device for determining the quantity of product in an ink reservoir according to claim 62, the device being included in an image formation device.

64. A device according to claim 63, the image formation device being included in a printer.

65. A device according to claim 63, the image formation device being included in a facsimile machine.

66. A device according to claim 63, the image formation device being included in a microcomputer.

67. A device for processing an electrical signal, said device cooperating with a connecting unit which connects a product present in a reservoir to a predetermined potential, the reservoir being connected to an ejector which ejects the product, the connection being effected through the ejector and the connection being of a capacitive type, an establishing unit which establishes an electrical field through the product present in the reservoir, and a measuring unit which measures the electrical field passing through the product in order to produce an electrical signal representing the electrical field, said device comprising:

a processing unit which processes the electrical signal to produce a signal representing a quantity of the product present in the reservoir; and a detecting unit which detects an interruption of the connection of the product to the predetermined potential, the interruption corresponding to a predetermined quantity of product in the reservoir.

68. A reservoir, connected to an ejector which ejects a product, for containing the product, said reservoir comprising:

a connecting unit which connects the product to a predetermined potential, the connection being made through the ejector and being of a capacitive type;

an establishing unit which establishes an electrical field through the product contained in the reservoir; and a detecting unit which detects an interruption of the connection of the product to the predetermined potential, the interruption corresponding to at least a predetermined quantity of product present in the reservoir.

69. A cartridge including reservoir according to claim 68, wherein said connecting unit includes a capacitor having a first pole and a second pole, the first pole comprising a conductor connected to a predetermined potential and the second pole being formed by the product.

70. A reservoir according to claim 69, the reservoir being included in a cartridge.

* * * * *

UNITED STATES PATENT AND TRADEMARK OFFICE
CERTIFICATE OF CORRECTION

PATENT NO.     : 6,325,477 B1                                    Page 1 of 1
DATED          : December 4, 2001
INVENTOR(S)    : Pascal Coudray et al.

It is certified that error appears in the above-identified patent and that said Letters Patent is hereby corrected as shown below:

<u>Title page,</u>
Item [56], References Cited, FOREIGN PATENT DOCUMENTS, "61265531" should read -- 61-265531 --; and
Item [57], ABSTRACT,
Line 15, "t" should read -- to --.

<u>Drawings,</u>
Sheet 6, FIG. 6, "de" should read -- FROM --; and "vers" should read -- TO --.

<u>Column 7,</u>
Line 60, "The" should read -- ¶ The --.

<u>Column 10,</u>
Line 30, "hand" should read -- hand, --.

<u>Column 13,</u>
Line 7, "a" (second occurrence) should be deleted.

<u>Column 15,</u>
Line 45, "the of" should read -- the --.

<u>Column 18,</u>
Line 31, "A reservoir" should read -- A cartridge including reservoir --.

Signed and Sealed this

Thirtieth Day of July, 2002

Attest:

Attesting Officer

JAMES E. ROGAN
Director of the United States Patent and Trademark Office